United States Patent
Sestok et al.

(10) Patent No.: US 9,148,181 B2
(45) Date of Patent: Sep. 29, 2015

(54) REFERENCE CLOCK COMPENSATION IN DVB-H RECEIVERS

(75) Inventors: Charles Kasimer Sestok, Dallas, TX (US); Badri Varadarajan, Dallas, TX (US); Anand Ganesh Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1841 days.

(21) Appl. No.: 11/811,335

(22) Filed: Jun. 8, 2007

(65) Prior Publication Data

US 2007/0286262 A1   Dec. 13, 2007

Related U.S. Application Data

(60) Provisional application No. 60/804,375, filed on Jun. 9, 2006.

(51) Int. Cl.
*H04L 27/00* (2006.01)
*H04B 1/00* (2006.01)

(52) U.S. Cl.
CPC .................................. *H04B 1/0082* (2013.01)

(58) Field of Classification Search
CPC ...... H04L 5/001; H04L 27/2647; H04B 1/06; H04B 1/0082
See application file for complete search history.

(56) References Cited

U.S. PATENT DOCUMENTS

| | | | |
|---|---|---|---|
| 6,741,836 B2 * | 5/2004 | Lee et al. | 455/41.2 |
| 7,010,307 B2 * | 3/2006 | Abraham | 455/456.1 |
| 7,242,960 B2 * | 7/2007 | van Rooyen | 455/552.1 |
| 2002/0187784 A1 * | 12/2002 | Tigerstedt et al. | 455/439 |
| 2003/0099215 A1 * | 5/2003 | O'Shea | 370/331 |
| 2003/0214436 A1 * | 11/2003 | Voor et al. | 342/418 |
| 2004/0005870 A1 * | 1/2004 | Yla-Jaaski et al. | 455/265 |
| 2006/0203950 A1 * | 9/2006 | Chung et al. | 375/376 |
| 2008/0043893 A1 * | 2/2008 | Nagaraj et al. | 375/376 |

* cited by examiner

*Primary Examiner* — Kenneth Lam
(74) *Attorney, Agent, or Firm* — Ronald O. Neerings; Frank D. Cimino

(57) ABSTRACT

A wireless receiver providing multiple services (FIG. 3) is disclosed. The wireless receiver includes an oscillator circuit (304, FIG. 4) arranged to produce a reference frequency (308). A first receiver (302) receives a first signal (300) having a first carrier frequency in response to the reference frequency. A second receiver (322) receives a second signal (320) having a second carrier frequency different from the first carrier frequency in response to the reference frequency.

8 Claims, 3 Drawing Sheets

REFERENCE CLOCK COMPENSATION IN DVB-H RECEIVERS

CROSS-REFERENCES TO RELATED APPLICATIONS

This application claims the benefit, under 35 U.S.C. §119 (e)(1), of U.S. Provisional Application No. 60/804,375, filed Jun. 9, 2006, and incorporated herein by this reference.

BACKGROUND OF THE INVENTION

The present embodiments relate to wireless communications systems and, more particularly, to reference clock frequency compensation for Digital Video Broadcast-Handheld (DVB-H) and other wireless communication systems.

Wireless communications are prevalent in business, personal, and other applications, and as a result the technology for such communications continues to advance in various areas. One such advancement includes the use of spread spectrum communications, including that of code division multiple access (CDMA) which includes wideband code division multiple access (WCDMA) cellular communications. In CDMA communications, user equipment (UE) (e.g., a hand held cellular phone, personal digital assistant, or other) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. WCDMA includes alternative methods of data transfer, one being frequency division duplex (FDD) and another being time division duplex (TDD), where the uplink and downlink channels are asymmetric for FDD and symmetric for TDD.

The Global System for Mobile (GSM) communications is another common wireless standard. Most GSM systems use either 900 MHz or 1800 MHz bands. The 900 MHz band is divided into an 890-915 MHz uplink frequency band and a 935-960 MHz downlink frequency band. Each 25 MHz bandwidth is divided into 124 carrier frequency channels spaced 200 kHz apart. Each carrier frequency channel transmits and receives over eight time division multiple access (TDMA) time slots in each TDMA frame. TDMA communications are transmitted as a group of packets in a time period, where the time period is divided into time slots so that multiple receivers may access meaningful information during a different part of that time period. In other words, in a group of TDMA receivers, each receiver is designated a time slot in the time period, and that time slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

New standards for Digital Video Broadcast (DVB) standards are currently being developed to permit streaming video reception by portable user equipment. DVB typically uses carrier frequencies in the 470-800 MHz band. DVB packets or data streams are transmitted by Orthogonal Frequency Division Multiplex (OFDM) transmission with time slicing. With OFDM, multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver, and these tones are termed pilot tones or symbols. These pilot symbols can be useful for channel estimation at the receiver. An inverse fast Fourier transform (IFFT) converts the frequency domain data symbols into a time domain waveform. The IFFT structure allows the frequency tones to be orthogonal. A cyclic prefix is formed by copying the tail samples from the time domain waveform and appending them to the front of the waveform. The time domain waveform with cyclic prefix is termed an OFDM symbol, and this OFDM symbol may be upconverted to an RF frequency and transmitted. An OFDM receiver may recover the timing and carrier frequency and then process the received samples through a fast Fourier transform (FFT). The cyclic prefix may be discarded and after the FFT, frequency domain information is recovered. The pilot symbols may be recovered to aid in channel estimation so that the data sent on the frequency tones can be recovered.

Referring to FIG. 1, rectangles 100 and 102 represent DVB packets of a current data stream 104. The time between the start of DVB packets 100 and 102 is the delta-t time. Time between the DVB packets 100 and 102 is off time. The delta-t time is transmitted with other header information in each DVB packet to inform the DVB-H receiver when the next packet will arrive. The delta-t time is relative rather than absolute, so the DVB-H clock only needs to accurately measure the time from one packet to the next packet. Moreover, if a packet is lost, the DVB-H receiver may continue to monitor the carrier frequency 104 until the next packet arrives. This form of time slicing advantageously permits the DVB-H receiver to enter a low power mode or sleep mode after packet 100 is received. The DVB-H receiver subsequently wakes up in response to a timed interrupt to receive the next data packet 102. This method of operation greatly reduces power consumption by the DVB-H receiver and prolongs battery life. Alternatively, the DVB-H receiver may use this time between packets to monitor alternative carrier frequencies of nearby cells. These alternative carrier frequencies are provided in a Network Information Table (NIT) for each network.

Mobile handsets of the prior art use a different crystal oscillator circuit for each wireless service. Each crystal oscillator circuit is relatively expensive and may comprise more than 10% of the receiver module cost. Each additional mobile handset service, therefore, significantly increases the total cost of the handset. Thus, the present inventors have recognized a need for a cost effective reference frequency oscillator circuit that is compatible with multiple wireless services.

BRIEF SUMMARY OF THE INVENTION

A wireless receiver of the present invention provides a reference frequency from a single oscillator circuit for multiple wireless receivers. The wireless receiver includes a first receiver arranged to receive a first signal having a first carrier frequency in response to the reference frequency. The wireless receiver also includes a second receiver arranged to receive a second signal having a second carrier frequency different from the first carrier frequency in response to the reference frequency. Other devices, systems, and methods are also disclosed and claimed.

DETAILED DESCRIPTION OF THE INVENTION

Figure 2:
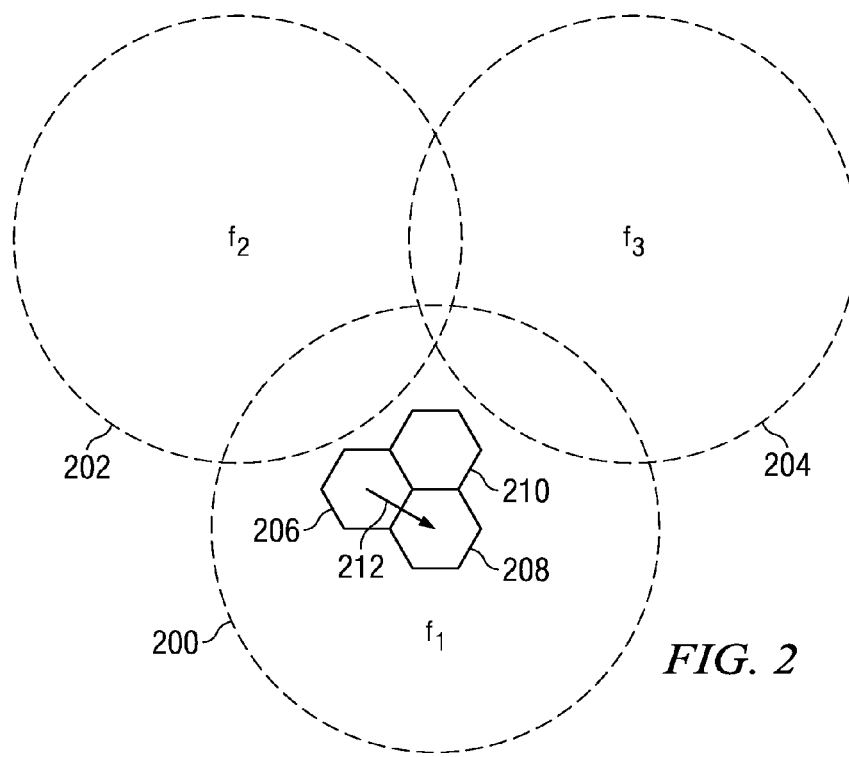
FIG. 2 is a diagram of a GSM network and a DVB multiple frequency network.

Referring now to FIG. 2, there is an exemplary GSM network and a DVB multi-frequency network (MFN). As will become apparent in the following discussion, GSM and DVB as well as other services such as WCDMA and Global Positioning System (GPS) services may be employed in a single mobile handset. The GSM network includes cells 206, 208, and 210. The MFN includes cells 200, 202, and 204 operating at frequencies $f_1$, $f_2$, and $f_3$, respectively. GSM cells 206, 208, 210 are much smaller than the DVB cells 200, 202, 204 to indicate the relative difference in transmit power of the base stations. GSM transmit power is relatively smaller than DVB transmit power to reduce interference with other base stations. Additionally, GSM handsets are preferably limited to 2 watts of transmit power and, therefore, limit the size of the GSM cell. DVB cells are subject to different constraints. DVB transmits signals to many different users in a single frequency cell so that interference is minimal. Moreover, cell size is not limited by transmit power of the mobile handset. Thus, DVB transmit power is much greater than GSM transmit power.

Arrow 212 represents a mobile handset moving between GSM cells 206 and 208. A handover from GSM cell 206 to GSM cell 208 may produce significant variations in the GSM carrier frequency. During the GSM handover the mobile handset remains in DVB cell 200. The carrier frequency $f_1$ of DVB cell 200, therefore, remains relatively unchanged during the GSM handover. The handover of one service while another service remains relatively unchanged produces a significant problem for different services using the same oscillator reference frequency. Although GSM pilot symbols may be used to detect and compensate for carrier frequency variations in the oscillator reference frequency circuit, this compensation should not erroneously compensate for DVB carrier frequency variations. Such erroneous compensation would produce read errors and degrade Doppler performance.

Figure 3:
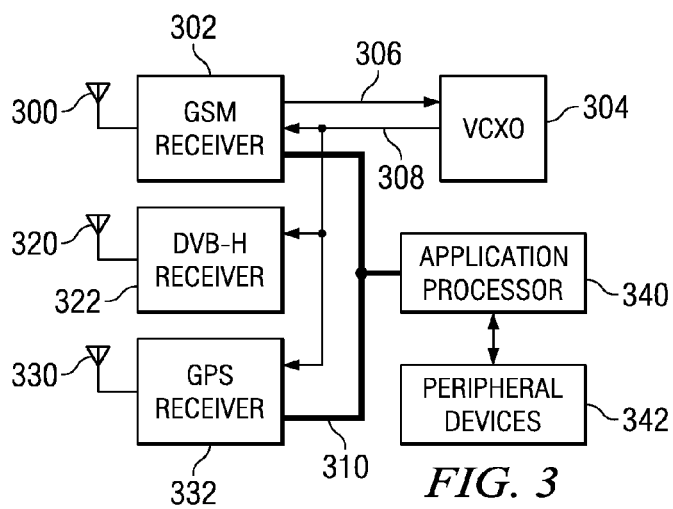
FIG. 3 is a circuit diagram of a multiple service handset of the present invention.

Turning now to FIG. 3, there is a schematic diagram of a multiple service wireless handset of the present invention. The handset includes three separate receivers. Since each receiver operates on a different carrier frequency, each receiver has a separate antenna. For example, GSM receiver 302 is coupled to antenna 300, DVB-H receiver 322 is coupled to antenna 320, and GPS receiver 332 is coupled to antenna 330. Each receiver is further coupled to application processor 340 by bus 310. Application processor 340 exchanges baseband signals with each receiver, performs appropriate signal processing operations, and sends resulting signals to respective peripheral devices 342. These peripheral devices preferably include a microphone, speaker, liquid crystal display (LCD), and other appropriate devices. Bus 310 includes data, address, and control signal lines to direct operation of each receiver. In particular, bus 310 preferably includes interrupt control signal lines as will be discussed in detail. The multiple service wireless handset also includes voltage controlled crystal oscillator (VCXO) 304. The VCXO 304 produces a reference frequency of preferably 38.4 MHz on lead 308. This reference frequency is supplied to each receiver (302, 322, and 332). Each receiver subsequently produces an appropriate multiplied frequency for down conversion of received signals by respective radio frequency (RF) front ends. The VCXO 304 receives control signals on lead 306 from GSM receiver 302. These control signals adjust the VCXO reference frequency as necessary to compensate for GSM carrier frequency changes due to handovers from one cell to another as well as other factors.

Figure 4:
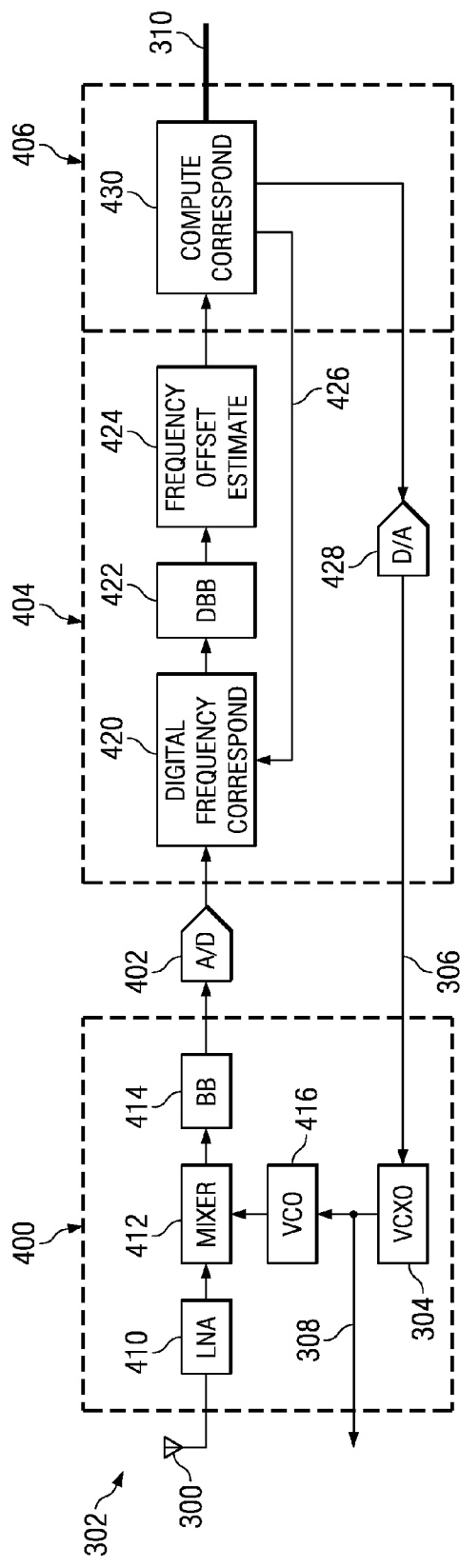
FIG. 4 is a circuit diagram of a GSM receiver of the present invention.

Turning now to FIG. 4, there is a circuit diagram of GSM receiver 302 showing circuit elements that are relevant to the present invention. In this embodiment of The GSM receiver 302 includes a radio frequency (RF) front end 400, an analog-to-digital (A/D) converter 402, a demodulator circuit 404, and a processor circuit 406. The RF front end includes a low noise amplifier (LNA) 410 coupled to antenna 300. The output of LNA 410 is applied to mixer 412. The RF front end 400 further includes voltage controlled crystal oscillator (VCXO) circuit 304 and voltage controlled oscillator (VCO) 416. In operation, VCXO 304 generates a reference frequency of preferably 38.4 MHz at lead 308. VCO 416 multiplies this reference frequency and applies the output to mixer 412. Mixer 412 mixes the output of VCO 416 with the output of LNA 410 to produce a down converted baseband signal. The down converted baseband signal is filtered by analog baseband filter (BB) 414. The analog baseband signal is then applied to A/D converter 402 to produce a digital baseband signal.

Demodulator circuit 404 receives and demodulates the digital baseband signal from A/D converter 402. In particular, demodulator circuit 404 includes digital frequency correction circuit 420, digital baseband filter (DBB) 422, and frequency offset estimate circuit 424. In operation, digital frequency correction circuit 420 receives signals from A/D converter 402 together with a correction signal on lead 426. The correction signal on lead 426 corrects the frequency of the received signal by a phase locked loop (PLL) and applies the output to digital baseband (DBB) filter 422. The output of DBB filter 422 is then applied to frequency offset estimate circuit 424 to produce a new frequency offset estimate. A preferred embodiment of the frequency offset estimate circuit 424 uses pilot symbols to estimate the frequency offset. Alternative embodiments may use other known data signals to produce the new frequency offset estimate. The new frequency offset estimate is then applied to processor circuit 406.

Processor circuit 406 includes a correction computation circuit 430. The correction computation circuit 430 performs several major tasks. First, it produces a correction signal on lead 426 that is applied to digital frequency correction circuit 420. Second, it produces a digital correction signal that is applied to digital-to-analog (D/A) circuit 428. This digital correction signal corresponds to a received carrier frequency change at the GSM receiver. As previously mentioned, these carrier frequency changes may be due to cell-to-cell handovers in the GSM network, Doppler shift, temperature variation, or other factors. D/A circuit 428 converts the digital correction signal to an analog correction signal on lead 306. The analog correction signal on lead 306 is applied to VCXO 304 to adjust the reference frequency on lead 308. The reference frequency on lead 308 compensates for carrier frequency change in the GSM receiver 302. The reference frequency on lead 308 is also applied to other receivers of the wireless handset. These other receivers, however, may not require carrier frequency compensation. A third task of computational correction circuit 430, therefore, is to transmit a frequency correction signal to the other receivers on bus 310. This frequency correction signal on bus 310 tells the other receivers (322 and 332) the change of the VCXO reference frequency on lead 308 and permits them to compensate for the modified reference frequency on lead 308.

Figure 5:
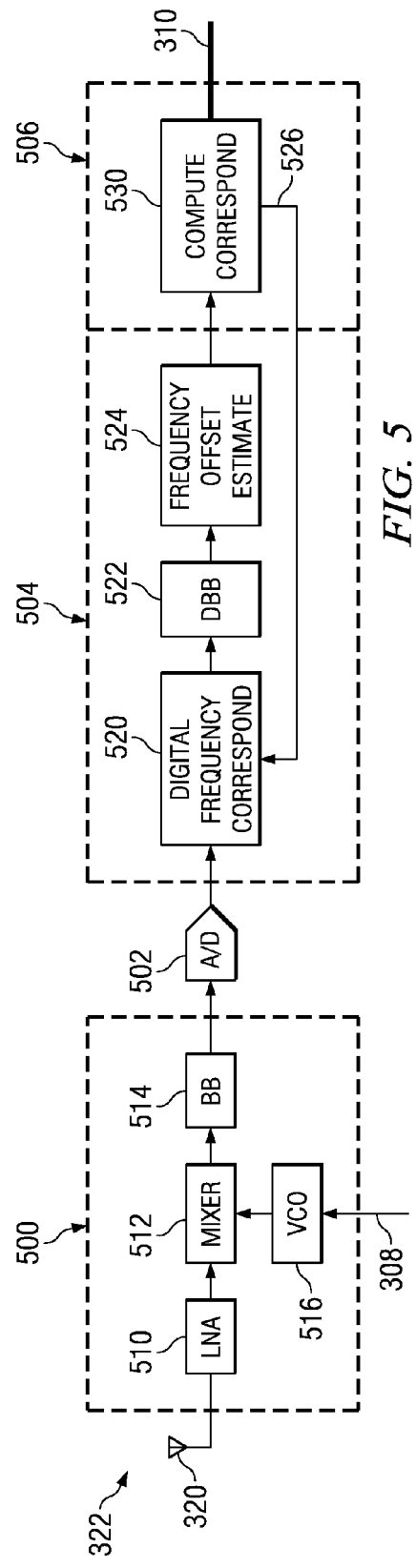
FIG. 5 is a circuit diagram of a DVB-H receiver of the present invention.

Referring now to FIG. 5, there is a circuit diagram of DVB-H receiver 322 showing circuit elements that are relevant to the present invention. The GPS receiver 332 includes similar features of the present invention, so only the DVB-H receiver 322 will be discussed in detail. The DVB-H receiver 322 includes a radio frequency (RF) front end 500, an analog-to-digital (A/D) converter 502, a demodulator circuit 504, and a processor circuit 506. The RF front end includes a low noise amplifier (LNA) 510 coupled to antenna 320. The output of LNA 510 is applied to mixer 512. The RF front end 500 further includes voltage controlled oscillator (VCO) circuit 516. In operation, VCO 516 receives a reference frequency of preferably 38.4 MHz at lead 308 from VCXO 304. VCO 516 multiplies this reference frequency and applies the output to mixer 512. Mixer 512 mixes the output of VCO 516 with the output of LNA 510 to produce a down converted baseband signal. The down converted baseband signal is filtered by analog baseband filter (BB) 514. The analog baseband signal is then applied to A/D converter 502 to produce a digital baseband signal.

Demodulator circuit 504 receives and demodulates the digital baseband signal from A/D converter 502. In particular, demodulator circuit 504 includes digital frequency correction circuit 520, digital baseband filter (DBB) 522, and frequency offset estimate circuit 524. In operation, digital frequency correction circuit 520 receives signals from A/D converter 502 together with a correction signal on lead 526. The correction signal on lead 526 corrects the frequency of the received signal by a phase locked loop (PLL) and applies the output to digital baseband (DBB) filter 522. The output of DBB filter 522 is then applied to frequency offset estimate circuit 524 to produce a new frequency offset estimate. A preferred embodiment of the frequency offset estimate circuit 524 uses pilot symbols to estimate the frequency offset. Alternative embodiments may use other known data signals to produce the new frequency offset estimate. The new frequency offset estimate is then applied to processor circuit 506. Processor circuit 506 includes a correction computation circuit 530. The correction computation circuit 530 performs several major tasks. First, it receives a frequency correction signal on bus 310 from processor circuit 406. Second, it produces a new correction signal on lead 526 that is applied to digital frequency correction circuit 520.

Figure 1:
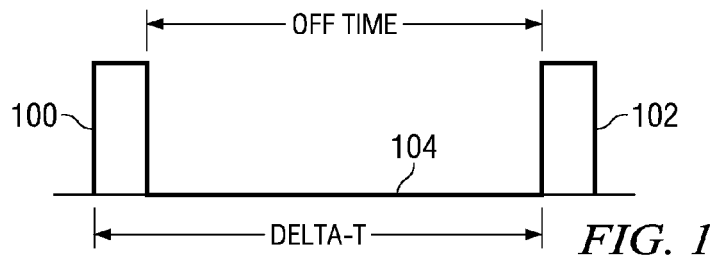
FIG. 1 is a block diagram of OFDM data packets showing off time and delta-t time.
Figure 6:
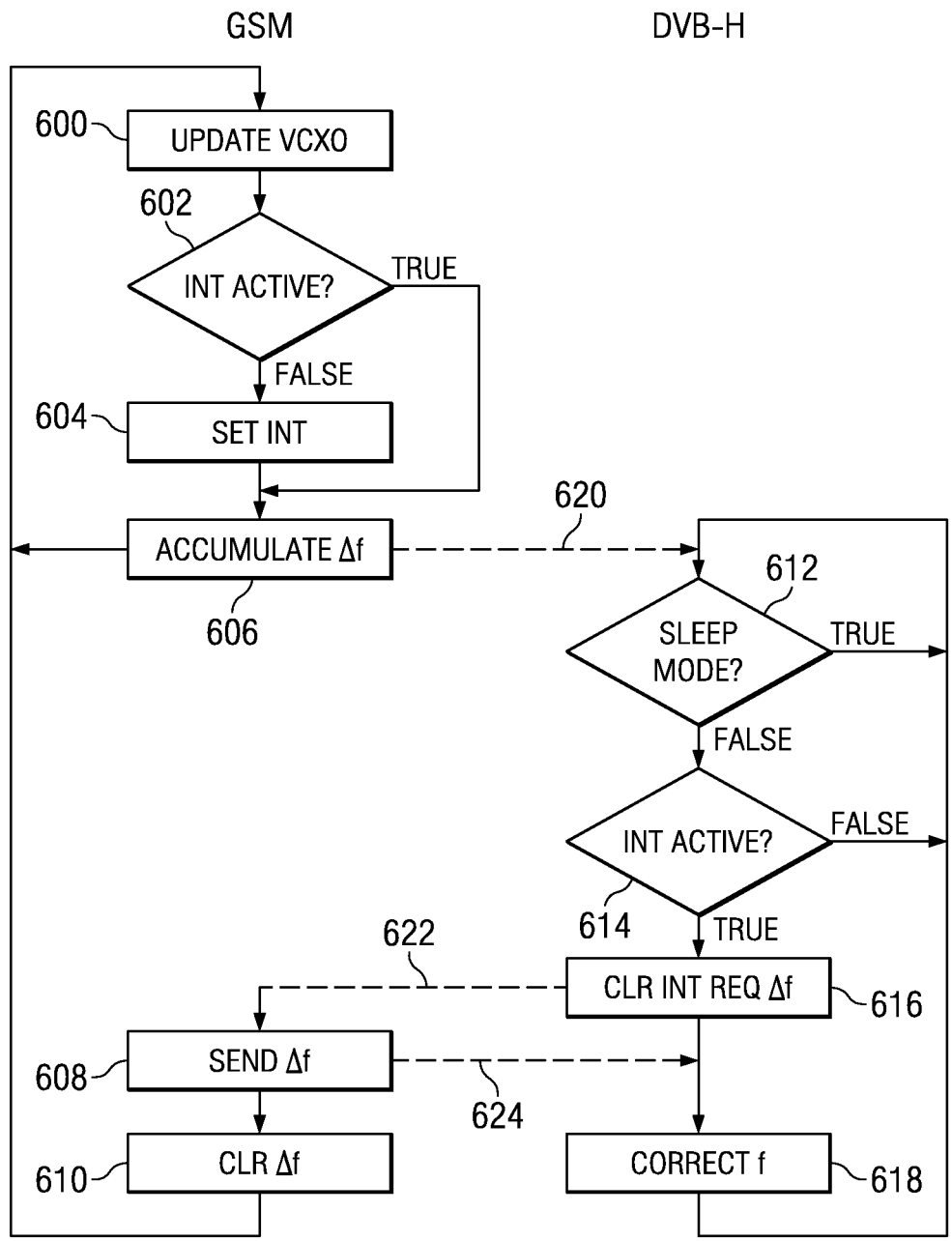
FIG. 6 is a flow chart showing operation of the GSM and DVB-H receivers of the present invention.

Referring now to FIG. 6, there is a flow chart showing operation of the GSM 302 and DVB-H 322 receivers of the present invention. The flow chart is organized to show operation of the GSM receiver 302 on the left and the DVB-H receiver 322 on the right. Solid lines indicate transfer of control. Dashed lines indicate signal flow. Operation of the GSM receiver 302 begins with an update of the voltage controlled crystal oscillator (VCXO) 304 frequency at block 600. As previously discussed, this is due to some variation in the GSM carrier frequency. Decision block 602 determines whether an interrupt signal to indicate a reference frequency modification is active. This interrupt signal notifies other receivers of an update to the VCXO reference frequency. If the interrupt signal is not currently active, it is set to active mode by block 604. Next block 606 adds the frequency change $\Delta f$ to any previous reference frequency modification. The interrupt signal is then applied 620 to the DVB-H receiver 322 via bus 310. Decision block 612 determines if the DVB-H receiver is in sleep mode. If it is in sleep mode, no action is taken until the DVB-H wakes up after delta-t (FIG. 1). After the DVB-H wakes up, decision block 614 determines if the interrupt signal is active. If the interrupt signal is inactive, no action is taken. Alternatively, if the interrupt signal is active, the DVB-H clears the interrupt signal and requests the current $\Delta f$ 622 at block 616. At block 608, the GSM receiver sends the current accumulated $\Delta f$ 624 to block 618 of the DVB-H receiver via bus 310. The current $\Delta f$ is then applied to digital frequency correction circuit 520 as indicated by block 618. The GSM receiver then clears the $\Delta f$ accumulator at block 610 and waits for the next VCXO update at block 600.

The current $\Delta f$ from the GSM receiver is used to negate the reference frequency update of the GSM receiver in the DVB-H receiver. This advantageously permits the use of a single voltage controlled crystal oscillator (VCXO) for multiple receivers in a wireless handset. The DVB-H receiver maintains a stable reference frequency even with reference frequency adjustments in the GSM receiver. Total cost of the wireless handset is reduced according to the present invention. Both receivers accurately track their respective carrier frequencies, thereby avoiding read errors and degraded Doppler performance.

Still further, while numerous examples have thus been provided, one skilled in the art should recognize that various modifications, substitutions, or alterations may be made to the described embodiments while still falling with the inventive scope as defined by the following claims. For example, in the foregoing embodiment the GSM receiver 302 is the master and produces the VCXO reference frequency, and the DVB-H receiver 322 is the slave and receives the VCXO reference. In alternative embodiments, any receiver might be the master and the other receivers would be slaves. In yet another embodiment, the master is selectable and the unselected receivers are slaves.

What is claimed is:

1. A wireless receiver, comprising:
   an oscillator circuit arranged to produce a reference frequency;
   a first receiver arranged to receive a first signal having a first carrier frequency and a fourth signal having a fourth carrier frequency different from the first carrier frequency in response to the reference frequency, the first receiver calculating a frequency correction signal in response to a handover from the first carrier frequency to the fourth carrier frequency; and
   a second receiver arranged to receive the frequency correction signal and a second signal having a second carrier frequency different from the first and fourth carrier frequencies in response to the frequency correction signal and the reference frequency.

2. A wireless receiver as in claim 1, comprising a third receiver arranged to receive the frequency correction signal and a third signal having a third carrier frequency different from the first and second carrier frequencies in response to the reference frequency and the frequency correction signal.

3. A wireless receiver as in claim 2, wherein the third receiver is a Global Positioning System (GPS) receiver.

4. A wireless receiver as in claim 1, wherein the first receiver is one of a Global System for Mobile (GSM) communications receiver and a wideband code division multiple access (WCDMA) receiver.

5. A wireless receiver as in claim 4, wherein the second receiver is one of a digital video broadcast (DVB) receiver and a Global Positioning System (GPS) receiver.

6. A wireless receiver as in claim 1, wherein the oscillator circuit is a crystal oscillator circuit.

7. A wireless receiver as in claim 1, wherein the oscillator circuit is a voltage controlled crystal oscillator circuit.

8. A wireless receiver as in claim 1, wherein the first receiver receives the first signal from a first antenna and wherein the second receiver receives the second signal from a second antenna.

* * * * *